United States Patent [19]

Yamamoto

[11] Patent Number: 4,857,754
[45] Date of Patent: Aug. 15, 1989

[54] POWER SUPPLY CIRCUIT FOR AUTOMOTIVE HEADLAMP

[75] Inventor: Yukio Yamamoto, Atsugi, Japan

[73] Assignee: Nissan Motor Company, Limited, Yokohama, Japan

[21] Appl. No.: 172,186

[22] Filed: Mar. 23, 1988

[30] Foreign Application Priority Data

Apr. 13, 1987 [JP] Japan .................................. 62-90400

[51] Int. Cl.⁴ .......................... B60Q 1/08; H02G 3/00
[52] U.S. Cl. .................................. 307/10.8; 307/112; 315/83; 315/82
[58] Field of Search ............... 307/10 R, 10 LS, 9, 307/112; 340/50, 52 R, 76, 92; 315/82, 83, 77

[56] References Cited

U.S. PATENT DOCUMENTS

| | | | |
|---|---|---|---|
| 2,131,664 | 9/1938 | Johansen | 307/10 LS |
| 2,266,548 | 12/1941 | Haines | 307/10 LS |
| 2,309,039 | 1/1943 | Bluemle et al. | 307/10 LS |
| 2,825,851 | 3/1958 | Lidiak | 315/83 |
| 3,179,845 | 4/1965 | Kulwiec | 315/83 |
| 3,832,597 | 8/1974 | Mitchell | 307/10 LS |
| 3,894,227 | 7/1975 | Pickjaan et al. | 315/83 X |
| 4,105,898 | 8/1978 | Farler et al. | 307/10 LS |
| 4,503,488 | 3/1985 | Soules et al. | 315/83 X |
| 4,728,861 | 3/1988 | Kurihara et al. | 340/52 R |

FOREIGN PATENT DOCUMENTS 8602606 5/1986 World Int. Prop. O. .......... 307/112

*Primary Examiner*—William M. Shoop Jr.
*Assistant Examiner*—Paul Ip
*Attorney, Agent, or Firm*—Foley & Lardner, Schwartz, Jeffery, Schwaab, Mack, Blumenthal & Evans

[57] ABSTRACT

A power supply circuit for automotive headlamp assemblies includes a switch assembly selectively operable between a first position at which the electrical power is supplied to high-beam valves of the headlamp assemblies, and a second position at which the electrical power is supplied to low-beam valves of the headlamp assemblies. The power supply circuit also includes means for establishing communication between a power source and the low-beam valves at the first position, so as to turn the low-beam valves on whenever the high-beam valves are turned on.

13 Claims, 2 Drawing Sheets

POWER SUPPLY CIRCUIT FOR AUTOMOTIVE HEADLAMP

BACKGROUND OF THE INVENTION

1. Field of The Invention

The present invention relates generally to a power supply circuit for headlamp assemblies which are mounted on automatic vehicles and each of which has high-beam and low-beam valves for high-beam and low-beam lighting, respectively. More specifically, the invention relates to an improved power supply circuit in which the high-beam and low-beam valves can be selectively connected to a power source.

2. Description of The Background Art

Some of such power supply circuits are provided with a combination switch which has a plurality of terminals. Each of the terminals is electrically connected to one of the low-beam or high-beam valves of headlamp assemblies or to a power source. The combination switch has three positions such as OFF, first and second positions, each of which has three modes such as low-beam, high-beam and flashing modes. In accordance with the selection of the position and mode, either the low-beam valves or high-beam valves of headlamp assemblies are in communication with the power supply via two connected terminals to be turned on, and the other valves are not turned on. According to such power supply circuits, only the high-beam valves can be turned on when in the high beam mode. Therefore, the illuminance of headlamp is not sufficient during the high beam mode.

SUMMARY OF THE INVENTION

It is therefore a principal object to provide a power supply circuit which turns the low-beam valves of headlamp assemblies on whenever the high-beam valves of the headlamp assemblies are turned on, to achieve brighter lighting in the high beam mode.

In order to accomplish the aforementioned and other specific object, the power supply circuit includes a switch assembly selectively operable between a first position at which the electrical power is supplied to high-beam valves of the headlamp assemblies, and a second position at which the electrical power is supplied to low-beam valves of the headlamp assemblies; and means for establishing the communication between a power source and the low-beam valves at the first position, so as to turn the low-beam valves on whenever the high-beam valves are turned on.

According to one aspect of the invention, the power supply circuit for an automotive headlamp system which includes first and second headlamp assemblies, each of which includes a low-beam valve for low beam lighting and a high-beam valve for high beam lighting, comprises:

a power source for supplying electrical power;

a switch assembly selectively operable between a plurality of switch positions including a first position at which the electrical power is supplied to the high-beam valves of the headlamp assemblies, and a second position at which the electrical power is supplied to the low-beam valves of the headlamp assemblies; and means for establishing the communication between the power source and the low-beam valves at the first position.

The switch assembly may have a plurality of terminals including a first terminal connected to the power source, a second terminal connected to the high-beam valves and a third terminal connected to the low-beam valves, the first terminal being connected to the second terminal at the first position, and to the third terminal at the second position. The means may connect the first terminal to the third terminal at the first position. Preferably, the means comprise a relay which is turned on at the first position to establish the communication between the power source and the low-beam valves.

According to another aspect of the invention, the power supply circuit for an automotive headlamp system which includes first and second headlamp assemblies, each of which includes a low-beam valve for low beam lighting and a high-beam valve for high beam lighting, comprises:

a power source for supplying electrical power; and a switch assembly selectively operable between a plurality of switch positions including a first position at which the electrical power is supplied to the high-beam and low-beam valves of the headlamp assemblies, and a second position at which the electrical power is supplied to the low-beam valves of the headlamp assemblies.

DESCRIPTION OF THE FIRST PREFERRED EMBODIMENT

Figure 1:
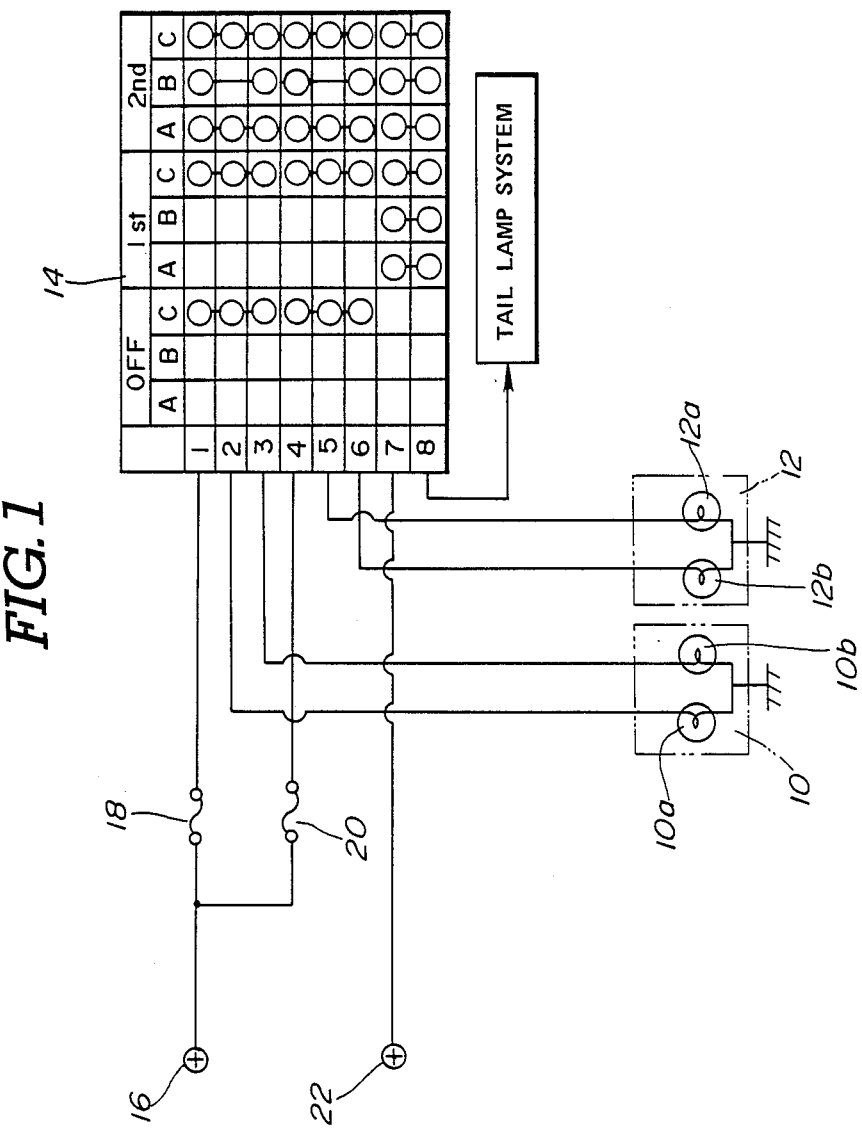
FIG. 1 is a circuit diagram of the first preferred embodiment of a power supply circuit for automotive headlamp assemblies according to the present invention.

Referring now to FIG. 1, the first preferred embodiment of a power supply circuit for automotive headlamp assemblies according to the present invention is described below.

The power supply circuit includes right and left headlamp assemblies 10 and 12, each of which comprises a high-beam valve 10a or 12a for high-beam lighting and a low-beam valve 10b or 12b for low-beam lighting.

The power supply circuit also includes a combination switch 14 which has terminals 1 to 8. The terminal 1 and 4 are electrically connected to a terminal 16 of a power source for the headlamp assemblies 10 and 12, via fuses 18 and 20 respectively. The terminals 2 and 3 are electrically connected to respective leads of the high-beam and low-beam valves 10a and 10b of the headlamp assembly 10, respectively. The other leads of valves 10a and 10b are connected to ground. The terminals 5 and 6 are electrically connected to respective leads of the high-beam and low-beam valves 12a and 12b of the headlamp assembly 12, respectively. The other leads of valves 12a and 12b are also connected to ground. The terminal 7 is electrically connected to a terminal 22 of a power source for tail lamps. The terminal 8 is electrically connected to the tail lamps.

The combination switch 14 has three positions: an OFF position at which the low-beam valves 10b and 12b are turned off, a first position and a second position. At each of these positions, the combination switch 14 has three modes: a high beam mode, a low beam mode and a flashing mode at which the high-beam valves 10a and 10b are temporally turned on for high-beam lighting in order to give the occupant in the forward vehicle warning. The high beam, low beam and flashing modes will be hereafter referred as to "mode A", "mode B" and "mode C", respectively.

The terminal 1 is electrically connected to the terminal 3 in the mode B in the second position. The terminal 1 is also connected to both of the terminals 2 and 3 in the mode C in each of the OFF, first and second positions, and in the mode A in the second position. The terminal 7 is electrically connected to the terminal 8 in each of the modes A, B and C in the first or second position.

When the combination switch 14 is switched to the mode C (flashing mode) in each of the OFF, first and second positions, or to the mode A (high beam mode) in the second position, the high-beam and low-beam valves 10a and 10b of the headlamp assembly 10 are in communication with the terminal 16 of the power source via the terminals 1 and 2, and via the terminals 1 and 3, respectively. The high-beam and low-beam valves 12a and 12b of the headlamp assembly 12 are also in communication with the terminal 16 of power source via the terminals 4 and 5, and via the terminal 4 and 6, respectively. As a result, all valves of the headlamp assemblies 10 and 12 are turned on for the flashing operation or the high-beam lighting mode.

When the combination switch 14 is switched to the mode B (low beam mode) on the second position, the low-beam valves 10b and 12b are in communication with the terminal 16 of power source via the terminals 1 and 3, and via the terminals 4 and 6, respectively. As a result, the low-beam valves 10b and 12b are turned on for the low beam lighting mode.

Furthermore, in each of modes A, B and C on the first or second position, the tail lamps are in communication with the terminal 16 of power source to be turned on.

As mentioned above, only the low-beam valves 10b and 12b are turned on when the mode B is selected at the second position. In addition, whenever the high-beam valves 10a and 12a are turned on, the low-beam valves 10b and 12b are also turned on. Therefore, the illuminance of the headlamp assemblies 10 and 12 can be increased during operation in the high-beam lighting mode. In particular, in the case of laterally elongated headlamp assemblies, this effect is pronounced.

Figure 2:
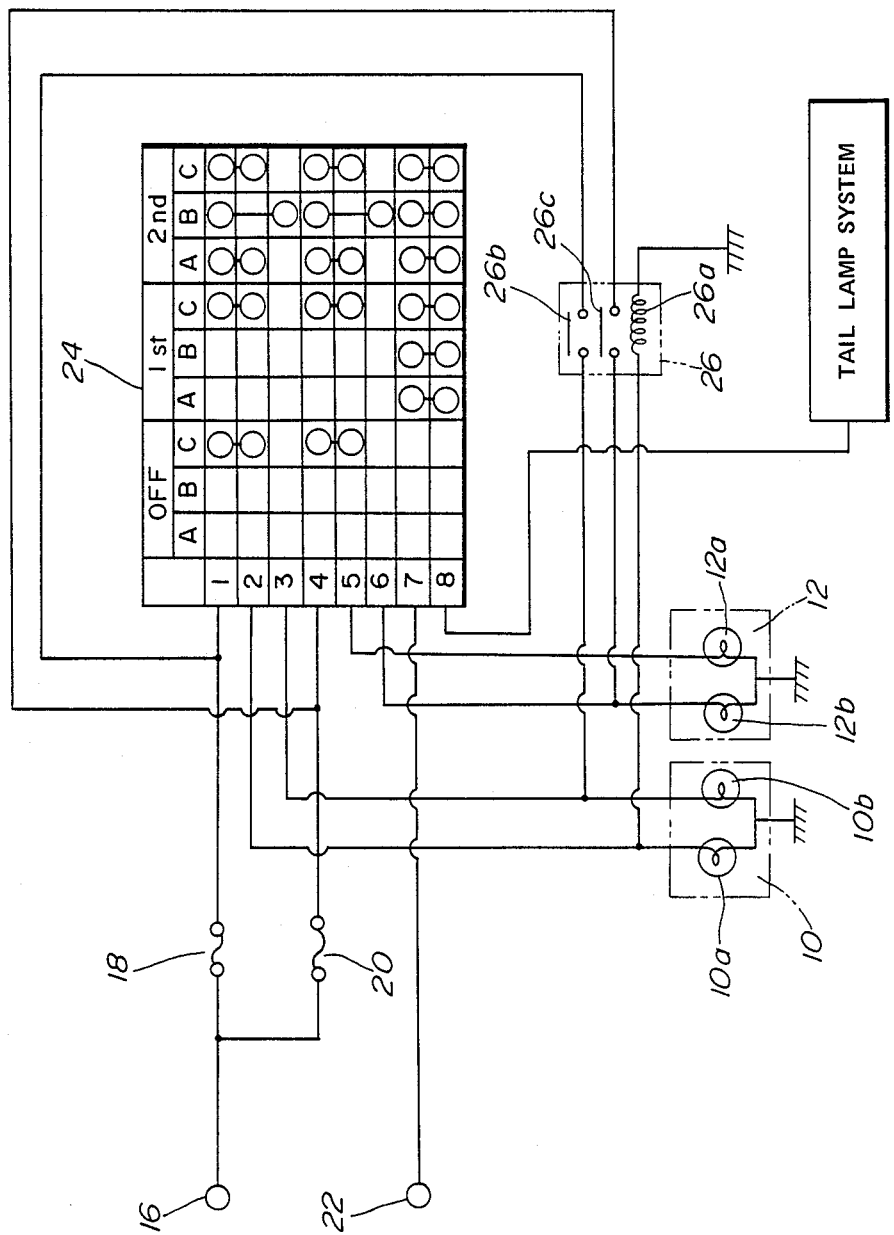
FIG. 2 is a circuit diagram of the second preferred embodiment of a power supply circuit for automotive headlamp assemblies of the invention.

FIG. 2 shows the second preferred embodiment of a power supply circuit for automotive headlamp assemblies according to the invention.

According to this embodiment, a combination switch 24 which may be conventional switch, is substituted for the combination switch 14. Similar to the switch 14, the combination switch 24 has also terminals 1 to 8, and the same three positions as that of the first preferred embodiment. At each of these positions, the combination switch 24 has the same three modes as that of the preferred embodiment. The terminals 1 to 8 are electrically connected to the corresponding element in the same manner as the first preferred embodiment.

The terminal 1 is electrically connected to the terminal 3 at the mode in the second position. The terminal 1 is also connected to the terminal 2 in the mode C in each of the OFF, first and second positions, and in the mode A in the second position. The terminal 7 is electrically connected to the terminal 8 in each of the modes A, B and C in the first or second position.

According to the second preferred embodiment, the power supply circuit further includes a relay 26 which comprises a relay coil 26a and normally open contacts 26b and 26c which are turned on when the electricity runs through the relay coil 26a. One end of the relay coil 26a of the relay 26 is electrically connected to the terminal 2, and the other end thereof is connected to ground. Therefore, the electricity runs through the relay coil 26a in the mode C in the each of OFF, first and second positions, and in the mode A in the second position, i.e. when the high-beam valve 10a of the headlamp assembly 10 is turned on. The low-beam valve 10b of the headlamp assembly 10 is electrically connected to the terminal 1 via the normally open contact 26b of the relay 26, and the low-beam valve 12b of the headlamp assembly 12 is electrically connected to the terminal 4 via the normally open contact 26c of the relay 26. As a result, whenever the high-beam valves 10a and 12a are turned on, the low-beam valves 10b and 12b are turned on. Accordingly, the same effect as the first preferred embodiment can be achieved by means of the relay 26.

Such an operation can also be performed by using a microcomputer.

What is claimed is:

1. A power supply circuit for an automotive headlamp system which includes first and second headlamp assemblies, each of which includes a low-beam valve for low-beam lighting and a high-beam valve for high-beam lighting, said power supply circuit comprising:
   a power source for supplying electrical power;
   a switch assembly selectively operable between a plurality of switch positions including a first position in which the electrical power is supplied to said high-beam valves of said headlamp assemblies, and a second position in wihch the electrical power is supplied to said low-beam valves of said headlamp assemblies; and
   means for establishing communication between said power source and said low-beam valves at said first position in a high-beam and a flash mode.

2. A power supply circuit as set forth in claim 1, wherein said switch assembly has a plurality of terminals including a first terminal connected to said power source, a second terminal connected to said high-beam valves and a third terminal connected to said low-beam valves, said first terminal being connected to said second terminal in said first position, and to said third terminal in said second position.

3. A power supply circuit as set forth in claim 2, wherein said means connects said first terminal to said third terminal at said first position.

4. A power supply circuit as set forth in claim 1, wherein said means comprises a relay which is turned on at said first position to establish communication between said power source and said low-beam valves.

5. A power supply circuit as set forth in claim 1, wherein said means is controlled by a microcomputer.

6. A power supply circuit for an automotive headlamp system which includes first and second headlamp assemblies, each of which includes a low-beam valve for low-beam lighting and a high-beam valve for high-beam lighting, said power supply circuit comprising:
   a power source for supplying electrical power; and
   a switch assembly selectively operable between a plurality of switch positions including a first position in which the electrical power is supplied to said high-beam and low-beam valves of said headlamp assemblies, and a second position in which the electrical power is supplied to said low-beam valves of said headlamp assemblies only said first position further being operable in both high-beam and flash modes.

7. A power supply circuit for an automotive headlamp system comprising:
an electrical power source;
first and second head lamp assemblies, each said headlamp assembly having a low-beam valve and a high-beam valve;
a switch assembly selectively operable between a plurality of positions, each position further having means for selecting among a plurality of modes;
said positions including first, second and third positions and said modes including high-beam, low-beam and flash modes;
said high and flash modes providing electrical power to said high-beam valves and said low-beam valves simultaneously.

8. The power supply circuit of claim 7, further comprising means for activating taillights when said switch is in said second and said third position.

9. The power supply circuit recited in claim 7, further comprising means for providing electrical power to said high-beam valves and said low-beam valves simultaneously in said flash mode, when said switch is in any one of said first, second and third positions.

10. A power supply circuit for an automotive headlamp system comprising:
an electrical power source;
first and second headlamp assemblies, each said assembly having a low-beam valve and a high-beam valve;
a switch assembly for selectively applying electrical power to said high-beam valves;
a normally open relay having a first pair of terminals connected to said power source, a second pair of terminals each of said second terminals connected to one of said low-beam valves, and an activating coil responsive to a separate relay terminal connected to one of said high-beam valves, said relay operative to connect said first and second pairs of terminals when power is applied to said high-beam valves.

11. The automotive headlamp system recited in claim 10, further comprising switchable means for applying electrical power to said low-beam valves only.

12. The automotive headlight circuit recited in claim 10 wherein said switch has a plurality of positions, each position adjustable to a high-beam, low-beam and flash mode.

13. The automotive headlight circuit of claim 12 wherein said switch applies electrical to said high-beam valves in said high-beam and said flash modes.

* * * * *